(12) United States Patent
Ilyadis et al.

(10) Patent No.: US 9,253,121 B2
(45) Date of Patent: Feb. 2, 2016

(54) UNIVERSAL NETWORK INTERFACE CONTROLLER

(71) Applicant: Broadcom Corporation, Irvine, CA (US)

(72) Inventors: Nicholas Ilyadis, Merrimack, NH (US); Ariel Hendel, Cupertino, CA (US); Karagada Ramarao Kishore, Saratoga, CA (US); Gregory John Scherer, Yorba Linda, CA (US)

(73) Assignee: Broadcom Corporation, Irvine, CA (US)

( * ) Notice: Subject to any disclaimer, the term of this patent is extended or adjusted under 35 U.S.C. 154(b) by 165 days.

(21) Appl. No.: 13/731,890

(22) Filed: Dec. 31, 2012

(65) Prior Publication Data

US 2014/0185612 A1    Jul. 3, 2014

(51) Int. Cl.
H04L 12/50    (2006.01)
H04L 12/931    (2013.01)

(52) U.S. Cl.
CPC ..................................... *H04L 49/35* (2013.01)

(58) Field of Classification Search
CPC .................................................... H04Q 1/028
USPC ........................................................ 370/359
See application file for complete search history.

(56) References Cited

U.S. PATENT DOCUMENTS

| | | | |
|---|---|---|---|
| 6,973,093 B1 | 12/2005 | Briddell et al. |
| 6,999,453 B1 | 2/2006 | Chemla et al. |
| 7,151,744 B2 | 12/2006 | Sarkinen et al. |
| 7,277,449 B2 | 10/2007 | Garinger et al. |
| 7,391,786 B1 | 6/2008 | Prasad et al. |
| 7,394,823 B2 | 7/2008 | Sano |
| 7,447,795 B2 | 11/2008 | Naghshineh et al. |
| 7,558,264 B1 | 7/2009 | Lolayekar et al. |
| 7,602,720 B2 | 10/2009 | Bergamasco et al. |
| 7,633,955 B1 | 12/2009 | Saraiya et al. |
| 7,685,281 B1 | 3/2010 | Saraiya et al. |
| 7,733,781 B2 | 6/2010 | Petersen |
| 7,742,489 B2 | 6/2010 | Chinn et al. |
| 7,773,526 B2 | 8/2010 | Abe |
| 7,860,120 B1 | 12/2010 | Wang et al. |
| 7,979,552 B1 | 7/2011 | Saraiya et al. |
| 8,139,482 B1 | 3/2012 | Eiriksson et al. |
| 8,213,427 B1 | 7/2012 | Eiriksson et al. |

(Continued)

FOREIGN PATENT DOCUMENTS

CN    101102305 A    1/2008
CN    101674335 A    3/2010

OTHER PUBLICATIONS

European Search Report, dated Nov. 23, 2012, in related European Patent Application No. 12004782.4, 7 pages.

(Continued)

*Primary Examiner* — Wei Zhao

(74) *Attorney, Agent, or Firm* — Sterne, Kessler, Goldstein & Fox PLLC

(57) ABSTRACT

A universal network interface controller (UNIC) is provided for interfacing a host computer to a switch fabric, a packet network, or both. The UNIC includes encapsulation logic configured to encapsulate a CBP communication for transmission as switch fabric data on the switch fabric. Finally, the UNIC includes transmit logic configured to transmit the encapsulated CBP communication to the remote CBP device using the switch fabric.

20 Claims, 8 Drawing Sheets

(56) References Cited

U.S. PATENT DOCUMENTS

| | | |
|---|---|---|
| 8,265,071 B2 | 9/2012 | Sindhu et al. |
| 8,331,362 B2 | 12/2012 | Shukla et al. |
| 8,335,213 B2 | 12/2012 | Sindhu et al. |
| 8,340,088 B2 | 12/2012 | Sindhu et al. |
| 8,509,069 B1 | 8/2013 | Poon et al. |
| 8,601,053 B2 | 12/2013 | Mehrotra et al. |
| 9,042,383 B2 | 5/2015 | Hendel et al. |
| 2002/0141427 A1 | 10/2002 | McAlpine |
| 2002/0145974 A1 | 10/2002 | Saidi et al. |
| 2003/0200315 A1 | 10/2003 | Goldberg et al. |
| 2006/0039374 A1 | 2/2006 | Belz et al. |
| 2007/0168475 A1* | 7/2007 | Mullahy et al. ............... 709/220 |
| 2008/0028096 A1 | 1/2008 | Henderson et al. |
| 2009/0080428 A1 | 3/2009 | Witkowski et al. |
| 2010/0061242 A1 | 3/2010 | Sindhu et al. |
| 2010/0061391 A1 | 3/2010 | Sindhu et al. |
| 2011/0176425 A1 | 7/2011 | Li et al. |
| 2013/0182708 A1* | 7/2013 | Sharma et al. ............... 370/392 |
| 2013/0322290 A1* | 12/2013 | Campbell et al. ............. 370/254 |

OTHER PUBLICATIONS

Office Action, dated Aug. 25, 2014 in related Chinese Patent Application No. 201210228742.0, 8 pages.

English language abstract of Chinese Patent Publication No. CN101102305A, published Jan. 9, 2008, from http://worldwide.espacenet.com, 2 pages.

English language abstract of Chinese Patent Publication No. CN101674335A, published Mar. 17, 2010, from http://worldwide.espacenet.com, 1 page.

* cited by examiner

600

A method of interfacing, using a switch fabric, a host computer with a remote computer bus protocol (CBP) device coupled to an endpoint.

Encapsulate a CBP communication for transmission as switch fabric data on the switch fabric; — 610

Transmit the encapsulated CBP communication to the remote CBP device using the switch fabric. — 620

End — 630

FIG. 6

UNIVERSAL NETWORK INTERFACE CONTROLLER

FIELD OF THE INVENTION

Embodiments of this invention are related to computer bus protocols and computer networks.

BACKGROUND

Computer system designers have used techniques to try to expand the ways that distributed applications control devices using a computer bus. Different techniques have been attempted to expand the geographic distance between a computer bus and a controlled device. Expanding the use of computer bus controlled devices by distributed applications is challenging.

It is especially difficult to communicate computer bus communications over a network along with other types of traffic. Traditional network communication problems are especially challenging when the network is used to try to control a computer bus protocol device.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

FIG. 6 provides a flowchart of interfacing, using a switch fabric, a host computer with a remote computer bus protocol (CBP) device according to an embodiment of the disclosure.

The present disclosure will be described with reference to the accompanying drawings. Generally, the drawing in which an element first appears is typically indicated by the leftmost digit(s) in the corresponding reference number.

DETAILED DESCRIPTION

Overview

Figure 1A:
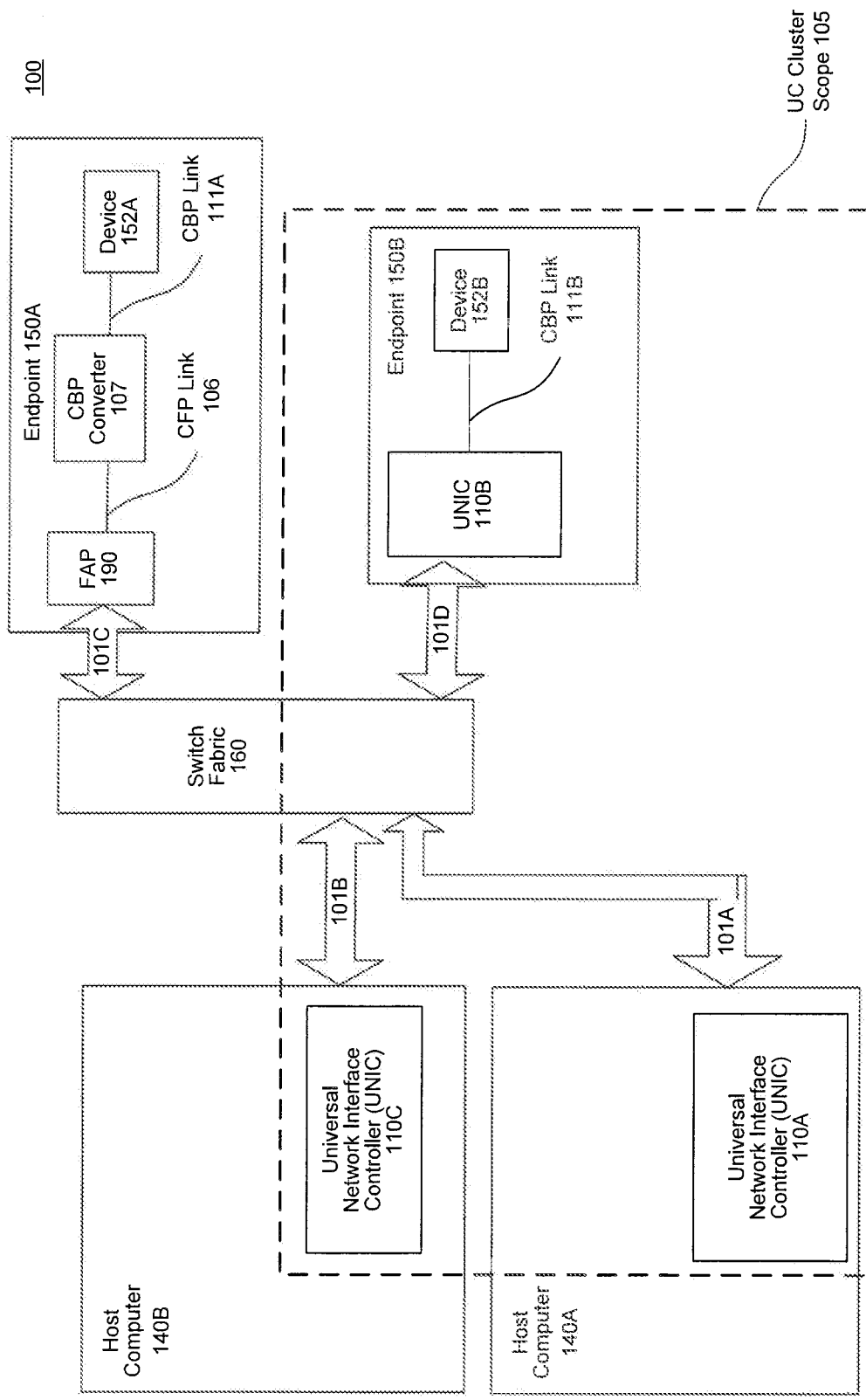
FIG. 1A is a block diagram of a switch fabric coupled to host computers and endpoints using a universal network interface controller (UNIC), according to an embodiment of the disclosure.

Embodiments use universal network interface controllers (UNIC) and a switch fabric to control remote devices using computer bus protocols (CBP). FIG. 1A illustrates a system 100 having host computers 140A-B, switch fabric 160 and endpoints 150A-B. Host computer 140A has UNIC 110A, host computer 140B has UNIC 110C and endpoint 150B has UNIC 110B. Switch fabric 160 is coupled using links 101A-D respectively to hosts 140A-B, endpoint 150A and endpoint 150B. Endpoints 150A-B have respective devices 152A-B. Universal Controller Cluster Scope (UC cluster scope) 105 includes UNICs 110A-C respectively in host 140A, endpoint 150B and host 140B. Endpoint 150A has fabric access point (FAP) 190 coupled to device 152A using CBP converter 107.

Examples of switch fabric 160, endpoints 150A-B, UNICs 110A-C and FAP 190 are described in U.S. patent application Ser. No. 13/173,189 ('189 application), filed on Jun. 30, 2011, entitled "Universal Network Interface Controller," which is incorporated by reference herein in its entirety, although the disclosure is not limited to the examples described in the '189 application.

UNICs 110A-C and switch fabric 160 enable controlling components and transferring data using CBPs in multi-tier computer networks. As would be appreciated by one having skill in the relevant art(s), given the description herein, CBPs can transfer a broad range of information, including commands for CBP connected devices and data received from these devices. For convenience, as used typically herein, both commands and data communicated using CBPs are termed "CBP communication."

In embodiments described herein, switch fabric 160 can carry both standard packetized data and CBP communication. A data path between host computer 140A and device 152B using UNICs 110A-B and switch fabric 160 can be termed a "CBP tunnel." As with other traffic carried by switch fabric 160, CBP communications are encapsulated into cells for transmission using the fabric and decapsulated for use at endpoints. Additional examples of encapsulation and decapsulation are described in the '189 application.

One example of CBP communications discussed herein is the transmission by switch fabric 160 of PCIe transaction layer packets (TLPs). PCIe TLPs can include commands from host computer 140A to devices 152A-B, and data transferred from device 152A-B to host computer 140A. It should be appreciated that other CBPs can be used by embodiments, e.g., the InfiniBand and FibreChannel protocols.

In an example, host computer 140A requires data from device 152B, which can be, for example, a solid state drive on endpoint 150B. Using standard CBP, host computer 140A generates a CBP communication to retrieve data from device 152B. UNIC 110A receives the generated CBP communication and encapsulates the CBP communication into a format for transmission using switch fabric 160. The encapsulated CBP communication is then transferred to UNIC 110B using switch fabric 160. After receipt by UNIC 110B, the encapsulated CBP communication is decapsulated by decapsulation logic into a decapsulated CBP communication. In this example, UNIC 110B relays the decapsulated CBP communication to and from device 152B using CBP link 111B. It should be noted that UNIC 110B uses CBP link 111B to directly transfer CBP communications to and from device 152B using CBP.

In response to the decapsulated CBP communication, device 152B retrieves the desired data and generates CBP communications to relay the retrieved data to host computer 140A. UNIC 110B receives and encapsulates the generated CBP communications for transmission to host computer 140A using switch fabric 160. Upon receipt of the encapsulated CBP communications, UNIC 110A decapsulates and relays the received CBP communications to host computer 140A.

In a variation of the example above, host computer 140A requires data from device 152A, which can be, for example, a solid state drive on endpoint 150A. Using CBP, host computer 140A generates CBP communication to retrieve data from device 152A. UNIC 110A receives the generated CBP communication and encapsulates the command into a format for transmission using switch fabric 160. The encapsulated CBP communication is transferred to FAP 190 using switch fabric 160. In contrast to the previous example, FAP 190 is not directly coupled to device 152A using a CBP link. FAP 190 is coupled to CBP converter 107 using a congestion free protocol (CFP) link. The term "CFP" is a term used herein to describe a protocol that guarantees the delivery of communications and reduces congestion in a link. One having skill in the relevant art(s) given the description herein, would appreciate that CFPs may substantially guarantee the delivery of communications and substantially reduce the congestion in a link. Example CFPs include CBPs noted herein, such as FibreChannel and InfiniBand. One having skill in the relevant art(s), given the description herein will appreciate other CFPs that could be used with embodiments. Further, non-guaranteed links can also be used. For example, a non-guaranteed link can be used by an embodiment when a higher-level protocol is used to guarantee delivery of link data. An Ethernet link, for example, can be used with embodiments when Data Center Ethernet (DCE) protocols are used.

FAP 190 has logic to decapsulate the received encapsulated CBP communication and rencapsulate the CBP communication in a proper format for CFP link 106. In response to the CBP communication from CFP link 106, CBP converter 107 converts the CFP encoded CBP communication into CBP communication for device 152A using CBP link 111A. In response, device 152A retrieves requested data and generates CBP communications to relay the retrieved data to host computer 140A. The above described encapsulation/decapsulation process is repeated in reverse for this transfer of data back to host computer 140A.

Figure 1B:
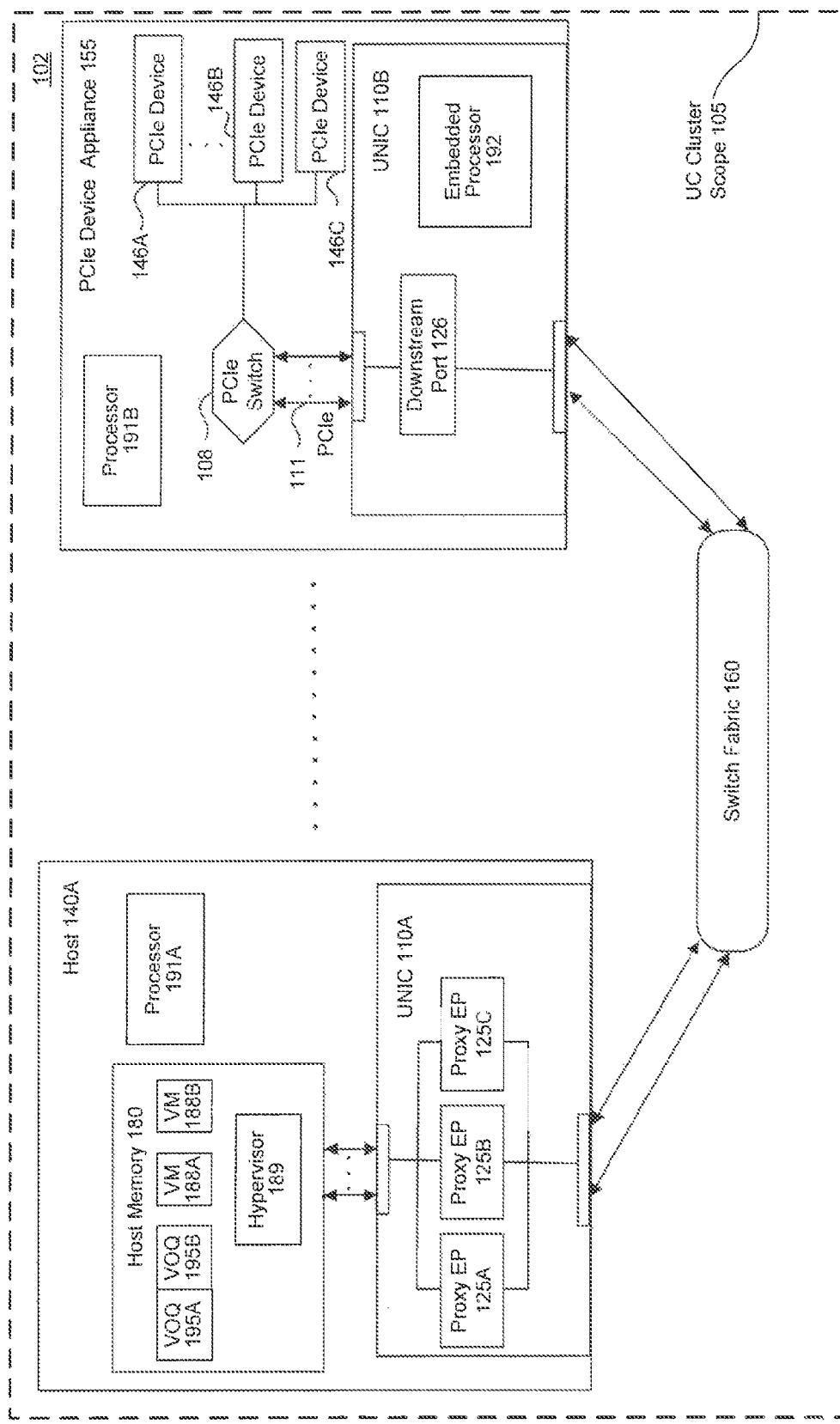
FIG. 1B is a block diagram of a switch fabric coupled to a host computer and a PCIe device appliance using a UNIC, according to an embodiment of the disclosure.

FIG. 1B illustrates a system 102 having host 140A and PCIe device appliance 155, which is one embodiment of endpoint 150B from FIG. 1A. A data path inside UC cluster 105 is provided between host 140A and PCIe device appliance 155 using switch fabric 160. PCIe device appliance 155 has PCIe devices 146A-C and UNIC 110B coupled to PCIe switch 108. UNIC 110B has downstream port 126 coupled to the switch fabric 160. Both UNICs 110A-B are coupled to switch fabric 160. Host 140A and PCIe device appliance 155 have processors 191A-B. Host 140A also has host memory 280 coupled to UNIC 110A. Host memory 180 includes virtual machines 188A-B controlled by hypervisor 189, and virtual output queues (VOQ) 195A-B, UNIC 110A has embedded processor 192.

UNIC 110A includes proxy endpoints (Proxy EPs) 125A-C to enable control of PCIe devices 146A-C. Each proxy EP 125A-C is associated with a respective PCIe device 146A-C and an appropriate driver (not shown). Therefore, each proxy EP 125A-C allows hypervisor 189 to connect to an associated PCIe device 146A-C on PCIe device appliance 155.

The types of CBP resources (e.g., PCI devices 146) that can be proxied using proxy EPs 125A-C include storage devices, and other devices such as FibreChannel or InfiniBand controlled devices. One having skill in the relevant art(s), given the description herein, would appreciate that other types of computer resources can also be controlled, such as graphics accelerators. When different types of resources are proxied by embodiments, switch fabric 160 can transport command and data payloads in marked cells that indicate the type of payload that is being carried.

In PCIe device appliance 155, each PCIe device 146A-C can be connected using PCIe switch 108 to downstream port 126 in UNIC 110B. Downstream port 126 is coupled to proxy EPs 125A-C using switch fabric 160. In an embodiment, PCIe devices 146A-C on PCIe appliance 155 are locally managed by processor 191B. Embedded processor 192 can also be used to manage PCIe devices 146A-C. Processor 191B can communicate with embedded processor 192 to ensure that PCIe device appliance 155 discovers and sets up the devices 146A-C.

To enable management of PCIe devices on PCIe device appliance 155, processor 191B can communicate with embedded processor 192 to establish how devices 146A-C are assigned to multiple hosts 140A-B. Processor 191B can assign PCIe devices 146A-C to hosts 140A-B either through policy or communication with hosts 140A-B.

When processor 191B communicates with hosts 140A-41, a separate management protocol can be used which enables PCIe devices 146A-C to be assigned to multiple hosts 140A-B. Protocols used to manage PCIe devices 146A-C include protocols for discovery, assignment, lifecycle management, etc. Once assignments are established, processor 191B can notify embedded processor 192 of the agreed upon host assignments so that embedded processor 192 can set up the datapath to appropriately direct packets to/from the devices 146A-C to assigned host 140A.

UNIC 110A can use VOQs 195A-B in host memory 180 to enqueue CBP communication to and from PCIe devices 146A-C. In this example, VOQ 195A-B are assigned to PCIe devices 146A-B respectively. In another example, VOQs 195A-B can be assigned to different flows to and from the same PCIe device 146A. The interaction of embodiments of VOQs 195A-B is discussed with reference to FIGS. 2-3 below.

Architecture

Figure 2:
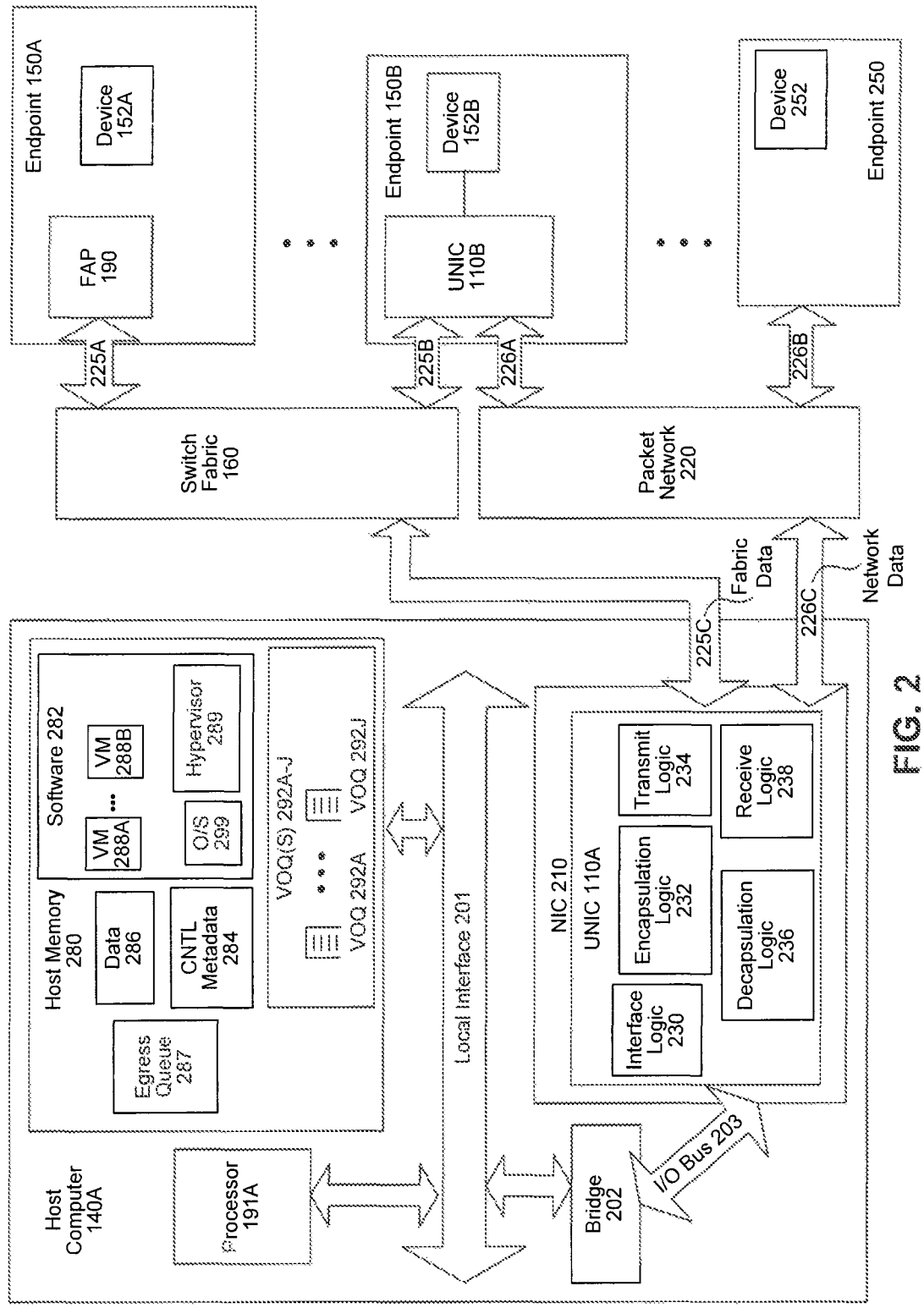
FIG. 2 is a block diagram of a host computer using a UNIC, according to an embodiment of the disclosure.

FIG. 2 illustrates a schematic block diagram of a host computer 140A, switch fabric 160, packet network 220, endpoints 150A-B and endpoint 250. Host computer 140A has host memory 280, processor 191A and network interface card (NIC) 210. Processor 191A, host memory 280 and bridge 202 are coupled to local interface 201, where bridge 202 is further coupled to NIC 210 using I/O bus 203. NIC 210 has UNIC 110A. UNIC 110A has interface logic 230, encapsulation logic 232, transmit logic 234, decapsulation logic 236, and receive logic 238. Endpoint 150A has FAP 190 and device 152A, endpoint 150B has UNIC, 110B and device 152B, and endpoint 250 has device 252. FAP 190 is coupled to switch fabric 160, UNICs 110A-B are coupled to both switch fabric 160 and packet network 220, and endpoint 250 is coupled to packet network 220.

Local interface 201 may comprise one or more buses, interfaces, and/or connections. For example, the local interface 201 may comprise a data bus with an accompanying address/control bus or other bus structure as can be appreciated.

NIC 210 communicates data, control, and addressing information to and from an I/O Bus 203, which is coupled to a bridge 202. An example I/O bus 203 used by embodiments is a PCI-Ex (PCIe) bus. The bridge 202 can be, for example, a Southbridge or an I/O controller hub (ICH), associated with a computer motherboard. Bridge 202 connects to local interface 201, so that the UNIC 110A can access host memory 280 and other components of the host computer 140A. Note that in some alternative embodiments UNIC 110A can be directly interfaced with local interface 201 on a computer motherboard such that bridge 202, I/O Bus 203, and NIC 210 are not necessary to implement UNIC 110A.

Host memory 280 stores one or more virtual output queues (VOQs) 292A-J, data 286, software (S/W) 282, and control (CNTL) metadata 284. S/W 282 typically includes an operating system (O/S) 299, virtual machines (VMs) 288A-B, and other optional applications, all of which can be executed by the processor 191A. The host memory 280 can further include volatile and nonvolatile memory, for example but not limited to, dynamic random access memory (DRAM), static random access memory (SRAM), read-only memory (ROM), hard disk drives, solid-state drives, etc. However, for this discussion, the host memory 280 is assumed to be DRAM.

VMs 288A-B are software implementations of a machine that executes programs like a physical computer. VOQs 292A-J are embodiments of VOQs 195A-B from FIG. 1B. VOQs 292A-J can be operationally presented as kernel buffer queues, user space queues, or hybrid queues where the enqueue-dequeue operations are controlled by a device driver for UNIC 110A (not shown). In different embodiments, the setup and maintenance of VOQs A-J are mediated by the O/S 299 kernel. The VOQ device driver is typically a kernel process, but can also be a user space process.

FIG. 2 illustrates a host side implementation of UNIC 110A in host computer 140A. In this host implementation, UNIC 110A has one or more system ports (not shown) that can be mapped to data producers and consumers, for example, the VMs 288A-B operated by hypervisor 289. When the UNIC 110A is used for traditional Ethernet packet interfaces, UNIC 110A implements transmit and receive functions for Ethernet packets using packet network 220. UNIC 110A can also be used with the cell fabric interface of switch fabric 160.

As discussed further with reference to FIG. 3 below, in this implementation, UNIC 110A queues and schedules packets or cells for transmission through switch fabric 160. For example, when UNIC 110A receives a CBP communication from VM 288A for transfer to device 152B, UNIC 110A can use VOQ 292B in host memory 280 to queue the received CBP communication before transmission. In this example, each VOQ 292A-J is assigned to a different endpoint 150A-B and 250. For example, because device 152B is in endpoint 150B, if required, commands destined for device 152B are enqueued in VOQ 292B. In another example, multiple VOQs 292A-J can be assigned to different flows destined to the same endpoint 140A.

Without the beneficial approaches described herein, combining Ethernet and CBP communications from the same NIC 210 to endpoints 150A-B and 250 has the potential for introducing large latencies into the CBP communications. Large latencies in transfers could occur when a CBP communication enters the system serially just as a maximum size Ethernet packet is starting to be transferred. Without the scheduling approaches described herein, a large delay could result because the CBP communication could have to wait until the Ethernet packet is fully transmitted. Switch fabric 160 can alleviate this latency problem because the switch fabric interface has a multitude of links that can carry CBP communications interleaved with standard Ethernet frames. This interleaving can be performed by encapsulation logic 360, and can reduce the delays associated with relaying both types of traffic.

Figure 3:
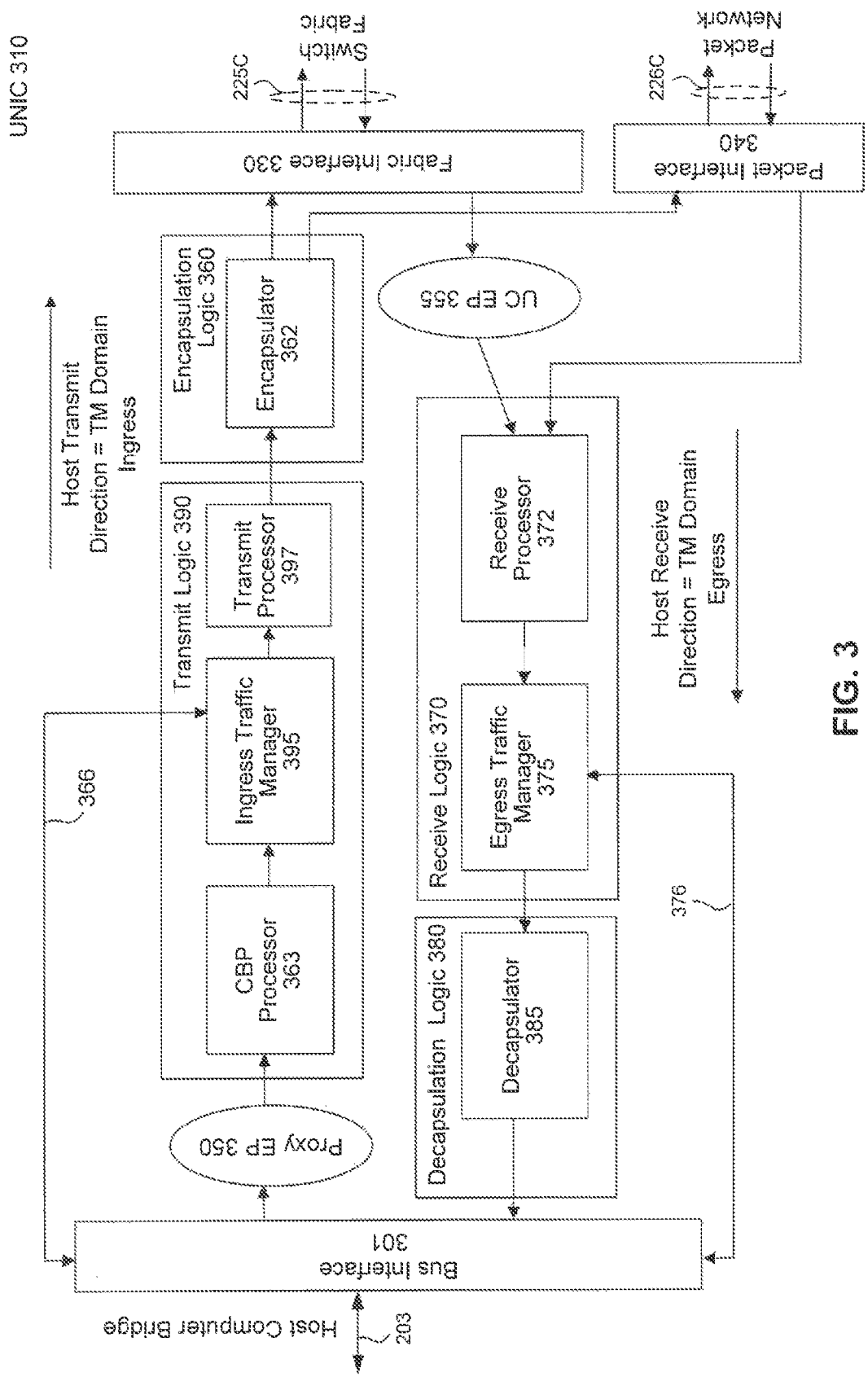
FIG. 3 is a flow diagram of communications within a UNIC, according to an embodiment of the disclosure.

FIG. 3 is a functional block diagram of the architecture of UNIC 310, which is one embodiment of UNIC 110A from FIGS. 1A and 1B. UNIC 310 includes one or more bus interfaces 301, only one of which is shown for simplicity. Bus interface 301 is connected to host computer 140A using I/O Bus 203 and host computer bridge 202 as shown in FIG. 2. This connection enables UNIC 310 to communicate with processor 191A and host memory 280 associated with host computer 140A.

UNIC 310 includes proxy endpoint (proxy EP) 350, encapsulation logic 360, transmit logic 390, decapsulation logic 380, receive logic 370, universal controller endpoint (UC EP) 355, fabric interface 330 and packet interface 340. Encapsulation logic 360 includes encapsulator 362, transmit logic 390 includes CBP processor 363, ingress traffic manager 395 and transmit processor 397. Decapsulation logic 380 includes decapsulator 385, and receive logic 370 includes egress traffic manager 375 and receive processor 372. As used herein, the terms "ingress traffic" and "egress traffic" relate to respective traffic entering into and exiting out of switch fabric 160. Encapsulation logic 360 and decapsulation logic 380 are respective embodiments of encapsulation logic 232 and decapsulation logic 236 from FIG. 2. Receive logic 370 and transmit logic 390 are respective embodiments of receive logic 238 and transmit logic 234 from FIG. 2.

To manage congestion and improve performance, UNIC 310 can use traffic management functions. These traffic management functions help to enable the successful transmission of CBP communications by switch fabric 160. One approach used by UNIC 310 to manage traffic uses VOQs 292A-J created in host memory 280. CBP processor 363 can read control metadata from CBP communications and provide queuing information to ingress traffic manager 395.

Ingress traffic manager 395 manages the use of VOQs 292A-J in host memory 280 using control data connection 366. To further manage congestion and improve performance, UNIC 310 can use transmit processor 397. Transmit processor 397 is designed to manage the transmission of CBP communications to one or more endpoints 150A-B and 250.

In the example of FIG. 3, the UNIC 310 is shown with separate physical connections to a fabric interface 330 and a packet interface 340. Fabric cells are communicated by the fabric interface 330 into the switch fabric 160, and network cells with packet headers are communicated by the packet interface 340 into the packet network 220. In other embodiments, these connections can be statically multiplexed to the same physical connections, operating in one mode or the other at any given point in time.

Receive logic 370 includes receive processor 372 and egress traffic manager 375. Receive processor 372 can use fabric cell header information or packet header information to queue requests using egress traffic manager 375 for one or more copies to be delivered into one or more host computer 140A ports.

Egress traffic manager 375 manages an egress queue 287 in host memory 280 using control connection 376. Typically, egress traffic manager 375 manages a smaller number of queues as compared to the VOQs 292A-J managed by ingress traffic manager 395. Decapsulator 385 decapsulates the received encapsulated CBP communications and relays the CBP communications to bus interface 301.

In an alternative embodiment, a plurality of bus interfaces 301 to host memory 280 can be implemented to enhance performance by increasing throughput capacity to and from UNIC 310. In this embodiment, scheduling information can be generated by ingress traffic manager 395 and communicated to the host computer 140A using control data connection 366. This scheduling information can be used to select a particular bus interface 301 for transmission.

An example is now revisited where host computer 140A requires data to be retrieved from device 152B on endpoint 150B. A CBP communication is generated by processor 191A, and relayed to bus interface 301 using the links described above.

From bus interface 301, the CBP communication is relayed to proxy EP 350. As discussed with respect to UNIC 110A in FIG. 1 above, UNIC 310 includes Proxy EP 350 to enable control of associated CBP devices. In this example, proxy EP 350 is associated with a device 152B and an appropriate driver (not shown). In this example, the CBP communication generated by processor 191A is directed to proxy EP 350 as if proxy EP 350 was device 152B.

Using a driver appropriate for device 152B, proxy EP 350 receives the CBP communication from bus interface 301 and relays the CBP communication to transmit logic 390. The components of transmit logic 390 can act to schedule and queue the CBP communication before encapsulation and transmission over switch fabric 160.

In transmit logic 390, CBP processor 363 receives CBP communication from proxy EP 350 and retrieves control metadata for use by ingress traffic manager 395. CBP processor 363 relays the CBP communication to ingress traffic manager 395. Ingress traffic manager 395 can manage outgoing traffic using control data connection 366. When the logic of ingress traffic manager 395 determines the CBP communication should be relayed to endpoint 150B, the CBP communication is relayed to transmit processor 397. Transmit processor 397 can determine which outgoing interface to use, either fabric interface 330 or packet interface 340. In this example transmit processor 397 selects fabric interface 330 for transmission to endpoint 150B using switch fabric 160. Switch fabric 160 requires data to be encapsulated, and therefore, once transmit processor 397 selects fabric interface 330 for transmission, encapsulator 362 in encapsulation logic 360 performs the encapsulation of CBP communication for transmission. Once the CBP communication is encapsulated for transmission, encapsulator 362 relays the encapsulated CBP communication to fabric 160 using fabric interface 330. Once received at endpoint 150B, the CBP communication is relayed to device 152B, where the desired data is retrieved and returned in return CBP communication.

UC EP 355 receives the returned CBP communication having the desired data from the device 152 via the fabric interface 330. The CBP communication is relayed to receive processor 372 and egress traffic manager 375 in receive logic 370. From receive logic 370, the CBP communication is received by decapsulator 385 in decapsulation logic 380. Using bus interface 301, the received data is relayed to the host computer 140A via the I/O bus 203 and the host computer bridge 202.

EXAMPLES

Figure 4:
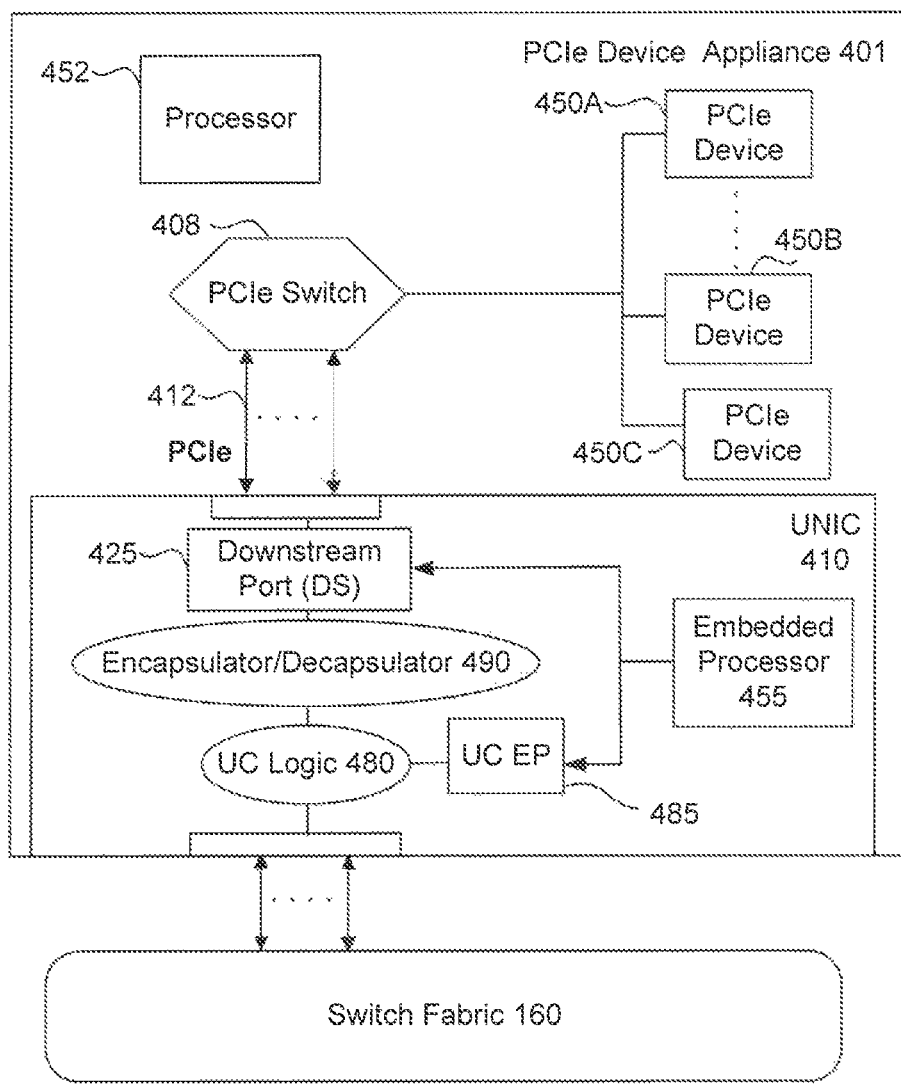
FIG. 4 is a PCIe device appliance having a UNIC coupled to a switch fabric, according to an embodiment of the disclosure.

FIG. 4 illustrates a system 400 having a PCIe device appliance 401, which is one embodiment of endpoint 150B from FIG. 1A and PCIe device appliance 155 of FIG. 1B. PCIe appliance 401 has processor 452, PCIe switch 408, PCIe Devices 450A-C and UNIC 410, which is one embodiment of UNIC 110B from FIG. 1A. UNIC 410 has embedded processor 455, encapsulator/decapsulator 490, universal controller endpoint (UC EP) 485, universal controller logic (UC logic) 480, and downstream port (DS Port) 425. Processor 452 is one embodiment of processor 191B from FIG. 1B, and embedded processor 455 is one embodiment of embedded processor 192 from FIG. 1B.

As introduced with reference to FIG. 1A, endpoints 150A-B can either be inside or outside UC cluster scope 105. Because SSD appliance 401 has UNIC 410, it is inside UC cluster scope 105. As discussed with reference to FIGS. 1A-B above, switch fabric 160 can carry both standard packetized data and CBP communication. CBP communications from PCIe device appliance 401 are encapsulated into cells for transmission using the switch fabric 160 by encapsulator/decapsulator 490. Encapsulator/decapsulator 490 also decapsulates CBP communications received from a computer host.

Once outgoing CBP communication are encapsulated, UC logic 480 schedules and queues the CBP communication. UC logic 480 can perform outgoing traffic management functions similar to those described above performed by transmit logic 390 shown in FIG. 3. For example, UC logic 480 can manage the use of VOQs stored in the memory of PCIe device appliance 401 (not shown). The encapsulated CBP communication is relayed by UC logic 480 to switch fabric 160 for transmission to a host computer.

UC logic 480 can also perform functions similar to those described above performed by receive logic 370. When CBP communications are received from a host computer, UC logic 480 receives the communications and manages decapsulation by encapsulator/decapsulator 490. UC logic 480 can use fabric cell header information or packet header information to queue CBP communications received from, or directed to, host computers 140A-B. Configuration information from embedded processor 455 can also be used to determine the encapsulation and decapsulation operations performed by encapsulator/decapsulator 490.

The "downstream" (DS) in DS port 425 refers to the downstream relationship of the port to embedded processor 455. DS port 425 receives management information for managing PCIe devices 450A-C. DS port 425 is linked to PCIe switch 408 using a PCIe protocol. DS port 425 provides an input/output port for PCIe communications 412 to and from PCIe switch 408. The section below describes the use of exemplary CBP devices in a CBP appliance. The examples below discussed with respect to PCIe devices can be applied to other types of CBP devices as well.

In different embodiments, PCIe SSDs 450A-C on SSD appliance 401 are locally managed by either embedded processor 455 or processor 452. This management can involve the dynamic assignment of PCIe resources to different host computers 140A-B. To improve the dynamic assignment of PCIe devices to host computers 140A-B, a management protocol may be used between the SSD appliance 401 and host computers 140A-B. This management protocol can improve discovery of PCIe devices, assignment of PCIe devices to different hosts, and the lifecycle management of PCIe devices. This dynamic assignment can improve the efficient distribution of resources across host computers 140A-B. Embedded processor 455 can perform optimization functions by managing the input/output functions of UC logic 480 and DS port 425 described above.

Management of PCIe SSDs 450A-C by processor 452 can also specify that processor 452 is the "master" processor and controls all physical aspects of the PCIe SSDs 450A-C. At power up of PCIe device appliance 401, PCIe SSDs 450A-C are recognized and physical and virtual device functions are configured. An inventory of functions available is prepared for sending to host computers 140A-B that may be seeking different PCIe device functions.

After host computer 140A connects to switch fabric 160 for example, the management software can determine devices available for pairing, along with device assignments. Because each PCIe function of PCIe SSDs 450A-C can be individually reset (using Function Level Reset), different resources operating on different host computers 140A-B can share a single physical device on PCIe device appliance 401. Switch fabric 160 can enable this sharing by providing a guaranteed delivery path from host computers 140A-B to PCIe SSDs 450A-C, with controllable QoS and isolation.

Each PCIe SSDs 450A-C hosted on PCIe device appliance 401 may be logically partitioned using different methods, including, multi-function, Single Root I/O Virtualization (SRIOV) or Multi-Root I/O Virtualization (MRIOV). MRIOV devices require additional components such as MRIOV switch and MRIOV-aware RCs and OS. MRIOV and SRIOV devices which are intended to be shared across multiple VMs 288A-B on host computer 140A can be shared across multiple hosts when connected through switch fabric 160.

Each function (PF in Multi-function device or VF in a SRIOV device) may be assigned to a separate host computer in the UC cluster scope 105. For example, each function of PCIe SSDs 450A-C can be assigned to a separate host computer 140A-B. Switch fabric 160 can be used to map separate VOQs 292A-J in host computer 140A to each of the functions required by host computer 140A. The functions required by host computer 140A can be mapped to functions provided PCIe device appliance 401. Each VOQs mapped to a PCIe device provides a guaranteed delivery path with a known quality of service for a required function.

Figure 5:
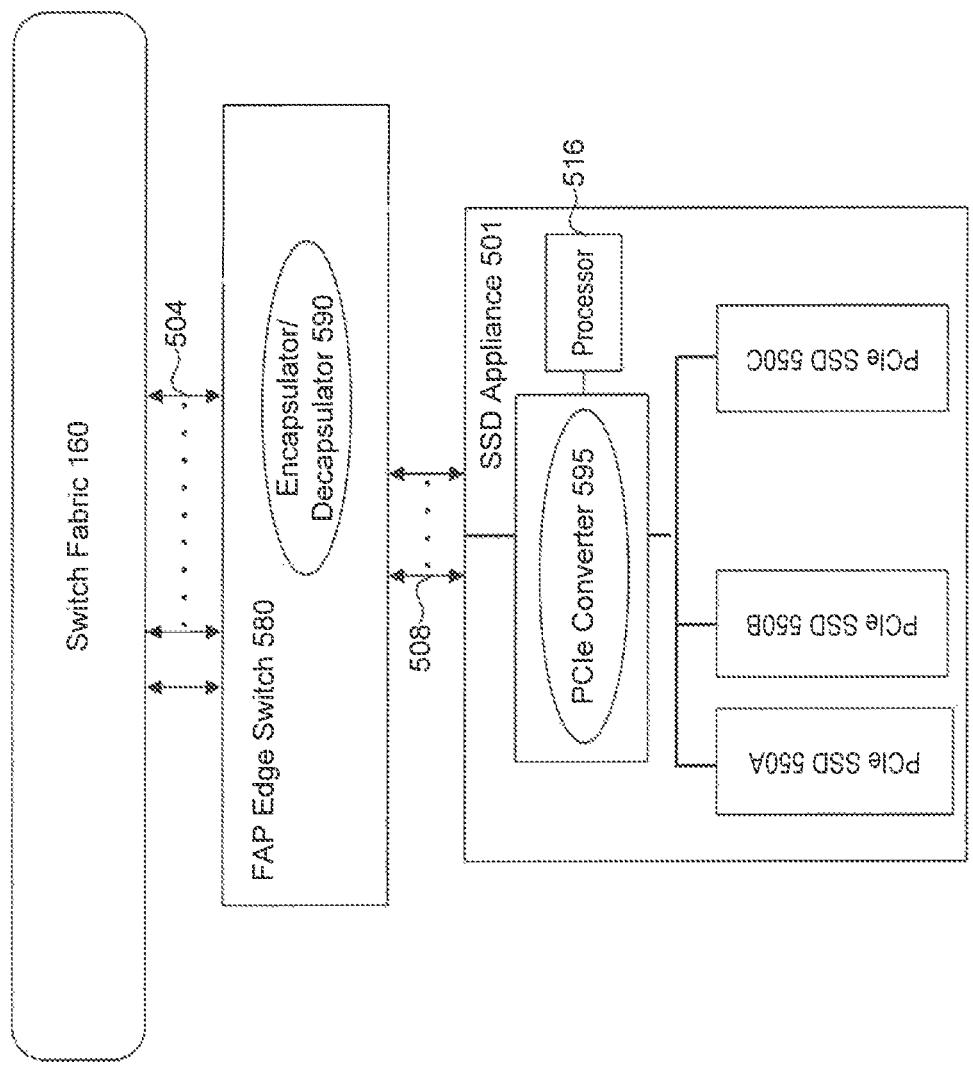
FIG. 5 is a PCIe device appliance coupled to a switch fabric using a fabric access point (FAP) edge switch, according to an embodiment of the disclosure.

FIG. 5 illustrates a system 500 having switch fabric 160, fabric access point (FAP) edge switch 580 and SSD appliance 501. SSD appliance 501 has processor 516, PCIe converter 595 and PCIe SSDs 550A-C, FAP edge switch 580 has encapsulator/decapsulator 590.

As introduced with reference to FIGS. 1 and 4 above, endpoints 150A-B can either be inside or outside UC cluster scope 105. Because SSD appliance 501 is coupled to switch fabric 160 using FAP edge switch 580, it is outside UC cluster scope 105.

In an embodiment, PCIe communications from host computer 140A are encapsulated by encapsulator 362 and sent over switch fabric 160 as cells to FAP Edge switch 580. The congestion-free and guaranteed delivery characteristics of switch fabric 160 extend using connection 504 to FAP edge switch 580. FAP edge switch 580 uses encapsulator/decapsulator 590 to decapsulate the received PCIe communications.

FAP edge switch 580 is connected to SSD appliance 501 (or any PCIe device) through link 508. Similar to the characteristics of switch fabric 160 connections, link 508 generally uses a CFP that minimizes congestion and guarantees delivery of decapsulated PCIe communication. Encapsulator/decapsulator 590 decapsulates the received PCIe packets into a form for transmission using link 508. Examples of protocols that can be used for link 508 are Distributed Computing Environment (DCE), FibreChannel (FC), and InfiniBand (IB). PCIe converter 595 converts the received link 508 protocol communication into PCIe communication for PCIe SSDs 550A-C. One having skill in the relevant art(s), with access to the teachings herein, will appreciate that, once received by PCIe SSD 550A, return PCIe communications can be generated by PCIe SSD 550A for transmission back to host computer 140A.

Method

This section and FIG. 6 summarize the techniques described herein by presenting a flowchart of an example method 600 of interfacing, using a switch fabric, a host computer with a remote computer bus protocol (CBP) device.

As shown in FIG. 6, method 600 begins at stage 610 where a CBP communication is encapsulated for transmission as switch fabric data on the switch fabric. In an embodiment, a CBP communication originating from VM 288A is relayed using local interface 201 to UNIC 110A. Using encapsulation logic 232, UNIC 110A encapsulates the received CBP communication for transmission using switch fabric 160 as switch data. Once stage 610 is complete, method 600 proceeds to stage 620.

At stage 620, the encapsulated CBP communication is transmitted to the remote CBP device using the switch fabric. In an embodiment, transmit logic 234 is used to transmit the encapsulated CBP communication from UNIC 110A to device 152B on endpoint 150B. Once step 620 is complete, method 600 ends.

Example Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
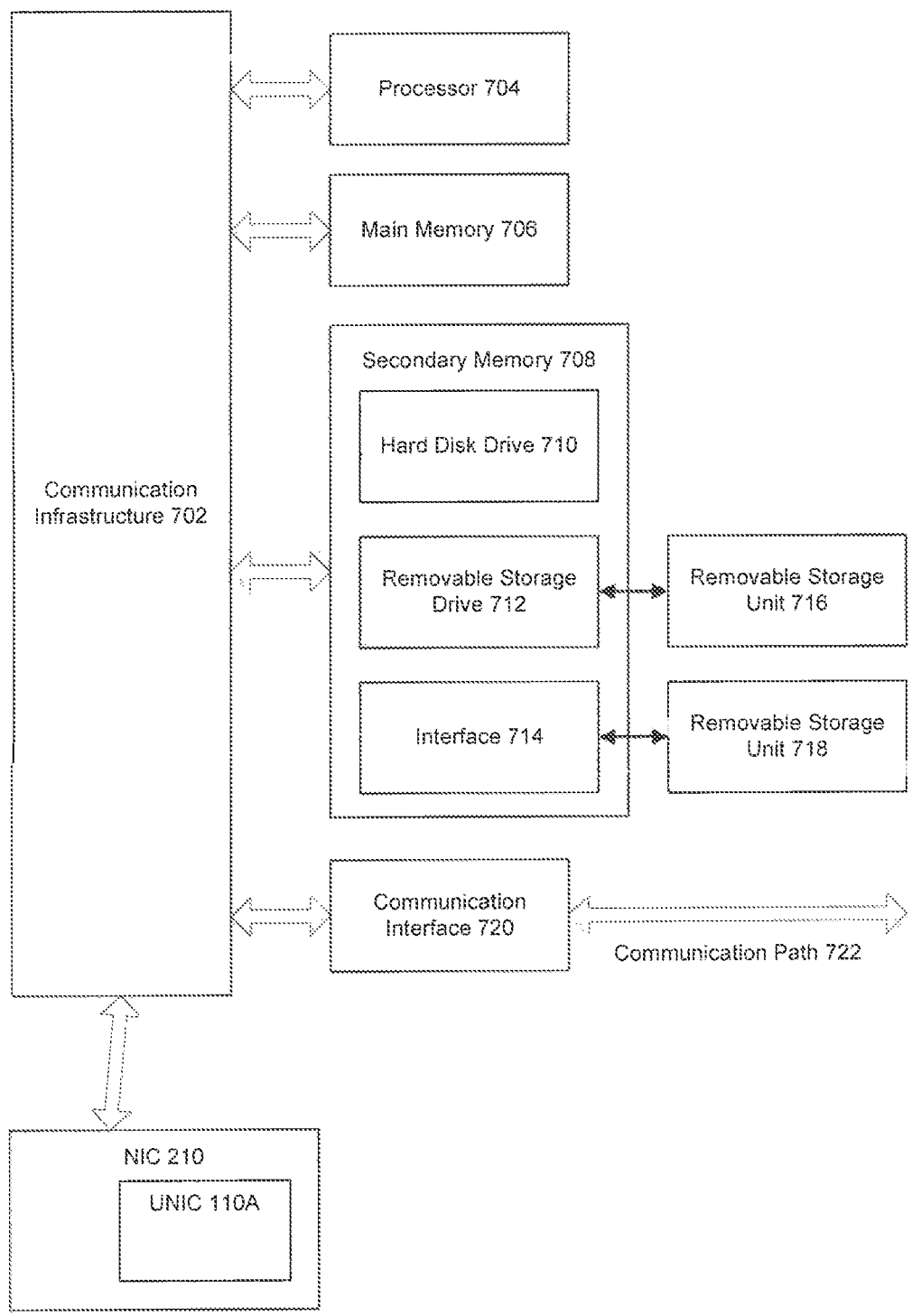
FIG. 7 is a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the invention may be implemented in the environment of a computer system or other processing system. An example of such a computer system 700 is shown in FIG. 7. All of the modules depicted in FIGS. 1-5, for example, can execute on one or more distinct computer systems 700. Furthermore, each of the steps of the flowchart depicted in FIG. 6 can be implemented on one or more distinct computer systems 700.

Computer system 700 includes one or more processors, such as processor 704. Processors 191A-B from FIGS. 1B and 2 are embodiments of processor 704. Processor 704 can be a special purpose or a general purpose digital signal processor having one or more processor cores. Processor 704 is connected to a communication infrastructure 702 (for example, a bus or network). NIC 210 is also coupled to communications infrastructure 702. NIC 210 has UNIC 110A.

Various software implementations are described in terms of this exemplary computer system. After reading this description, it will become apparent to a person skilled in the relevant art(s) how to implement the invention using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present invention as discussed herein. In particular, the computer programs, when executed, enable processor 704 to implement the processes of the present disclosure, such as any of the methods described herein. Accordingly, such computer programs represent controllers of the computer system 700. Where the disclosure described herein is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

What is claimed is:

1. A network interface controller (NIC) for interfacing, using a switch fabric, a host computer with a remote computer bus protocol (CBP) device coupled to an endpoint, comprising:
   a universal network interface controller comprising:
      transmit logic configured to receive a first CBP communication for the remote CBP device; and
      encapsulation logic configured to:
         encapsulate the first CBP communication into a switch fabric format for transmission as switch fabric data on the switch fabric,
         encapsulate an Ethernet frame for transmission as switch fabric data on the switch fabric,
         interleave the encapsulated first CBP communication and the encapsulated Ethernet frame for transmission using the switch fabric,
         relay the encapsulated Ethernet frame to the switch fabric, and
         relay the encapsulated first CBP communication to the remote CBP device using the switch fabric.

2. The NIC of claim 1, wherein the transmit logic is configured to receive the first CBP communication from a virtual machine operating in a memory associated with the host computer.

3. The NIC of claim 1, wherein the transmit logic is further configured to manage a virtual output queue (VOQ) in a memory associated with the host computer, the VOQ corresponding to the endpoint coupled to the remote CBP device.

4. The NIC of claim 3, wherein the transmit logic comprises:
   an ingress traffic manager configured to schedule fabric data in the VOQ and control dequeuing from the VOQ.

5. The NIC of claim 1, further comprising:
   receive logic configured to receive an encapsulated second CBP communication sent by the remote CBP device over the switch fabric; and
   decapsulation logic configured to decapsulate the encapsulated second CBP communication;
   wherein a memory associated with the host computer is configured to store the decapsulated second CBP communication.

6. The NIC of claim 5, wherein the encapsulation logic and the receive logic are communicatively coupled to an input/output (I/O) interface associated with the host computer.

7. The NIC of claim 5, wherein the receive logic comprises:
   a receive processor communicatively coupled to the switch fabric to receive the encapsulated second CBP communication, the receive processor configured to map the encapsulated second CBP communication to an egress queue; and
   an egress traffic manager configured to receive the encapsulated second CBP communication from the receive processor, the egress traffic manager further configured to manage the egress queue.

8. The NIC of claim 1, wherein the switch fabric is configured to transport the encapsulated first CBP communication and encapsulated Ethernet data transfers.

9. The NIC of claim 1, wherein the NIC appears to the host computer as a proxy for the remote CBP device.

10. The NIC of claim 1, wherein the remote CBP device is a graphics accelerator or a storage device.

11. The NIC of claim 1, further comprising logic for interfacing the host computer with a packet network.

12. A method of interfacing, using a switch fabric, a host computer with a remote computer bus protocol (CBP) device coupled to an endpoint, comprising:
   encapsulating a first CBP communication into a switch fabric format for transmission as switch fabric data on the switch fabric;
   encapsulating an Ethernet frame for transmission as switch fabric data on the switch fabric,
   interleaving the encapsulated first CBP communication and the encapsulated Ethernet frame for transmission using the switch fabric,
   relaying the encapsulated Ethernet frame to the switch fabric, and
   relaying the encapsulated first CBP communication to the remote CBP device using the switch fabric.

13. The method of claim 12, further comprising:
   receiving an encapsulated second CBP communication from the remote CBP device using the switch fabric, wherein the encapsulated second CBP communication is based on the first CBP communication;
   decapsulating the encapsulated second CBP communication; and
   storing the decapsulated second CBP communication in a memory associated with the host computer.

14. The method of claim 12, further comprising receiving the first CBP communication to be encapsulated from a virtual machine operating in a memory of the host computer.

15. The method of claim 12, further comprising managing a virtual output queue (VOQ) in a memory associated with the host computer, the VOQ corresponding to the endpoint coupled to the remote CBP device and used to queue the encapsulated first CBP communication before relaying to the remote CBP device.

16. The method of claim 15, further comprising scheduling the encapsulated first CBP communication in the VOQ.

17. The method of claim 13, further comprising mapping the received encapsulated second CBP communication to an egress queue.

18. The method of claim 12, wherein relaying the encapsulated first CBP communication using the switch fabric comprises relaying the encapsulated first CBP communication using a switch fabric configured to transport the encapsulated first CBP communication and encapsulated Ethernet data transfers.

19. A network interface controller (NIC), comprising:
a memory;
a processor coupled to the memory, the processor configured to, based on instructions stored in the memory:
receive a first computer bus protocol (CBP) communication for a remote CBP device;
encapsulate the first CBP communication into a switch fabric format for transmission as switch fabric data on a switch fabric,
encapsulate an Ethernet frame for transmission as switch fabric data on the switch fabric,
interleave the encapsulated first CBP communication and the encapsulated Ethernet frame for transmission using the switch fabric,
relay the encapsulated Ethernet frame to the switch fabric, and
relay the encapsulated first CBP communication to the remote CBP device using the switch fabric.

20. The NIC of claim 19, wherein the processor is further configured to, based on the instructions stored in the memory:
receive the first CBP communication from a virtual machine operating in a second memory associated with a host computer;
receive an encapsulated second CBP communication sent by the remote CBP device over the switch fabric; and
decapsulate the encapsulated second CBP communication.

* * * * *